United States Patent [19]
Rowse

[11] Patent Number: 5,201,167
[45] Date of Patent: Apr. 13, 1993

[54] MULTIPLE IMPLEMENT FRAME WITH PARALLEL MOUNTING BARS

[76] Inventor: Dan D. Rowse, R.R., Burwell, Nebr. 68823

[21] Appl. No.: 827,265

[22] Filed: Jan. 29, 1992

[51] Int. Cl.$^5$ .......................................... A01D 75/30
[52] U.S. Cl. .......................................... 56/6; 56/13.8; 56/15.5; 56/228; 56/DIG. 9; 280/412
[58] Field of Search .................. 56/6, 13.8, 15.5, 16.2, 56/218, 13.6, 228, DIG. 9, DIG. 14; 280/411.1, 412, 413

[56] References Cited

U.S. PATENT DOCUMENTS

| | | |
|---|---|---|
| 1,728,098 | 9/1929 | Bork . |
| 2,971,774 | 2/1961 | Bartel .................................. 280/412 |
| 2,976,058 | 3/1961 | Sandgren ............................. 280/413 |
| 3,292,948 | 12/1966 | McMasters et al. .................. 280/412 |
| 3,738,682 | 6/1973 | Ritter .................................. 280/413 |
| 3,893,283 | 7/1975 | Dandl ..................................... 56/6 |
| 4,178,010 | 12/1979 | Gerber .................................. 280/412 |
| 4,179,870 | 12/1979 | Rowse .................................... 56/6 |
| 4,344,639 | 8/1982 | Pollard ................................. 280/411 |

Primary Examiner—Terry Lee Melius
Attorney, Agent, or Firm—Zarley, McKee, Thomte, Voorhees & Sease

[57] ABSTRACT

A multiple implement frame includes front and rear implement mounting bars which maintain a parallel relationship at all times. The rear mounting bar may be displaced either to the left or right through operation of a power cylinder extending between the front mounting bar and an elongated frame member extending to the rear mounting bar. Single or double elongated frame members may be utilized. A single power cylinder is required with the double frame member unit and a pair of power cylinders are used for the single elongated frame unit. A double frame unit forms a parallelogram.

7 Claims, 3 Drawing Sheets

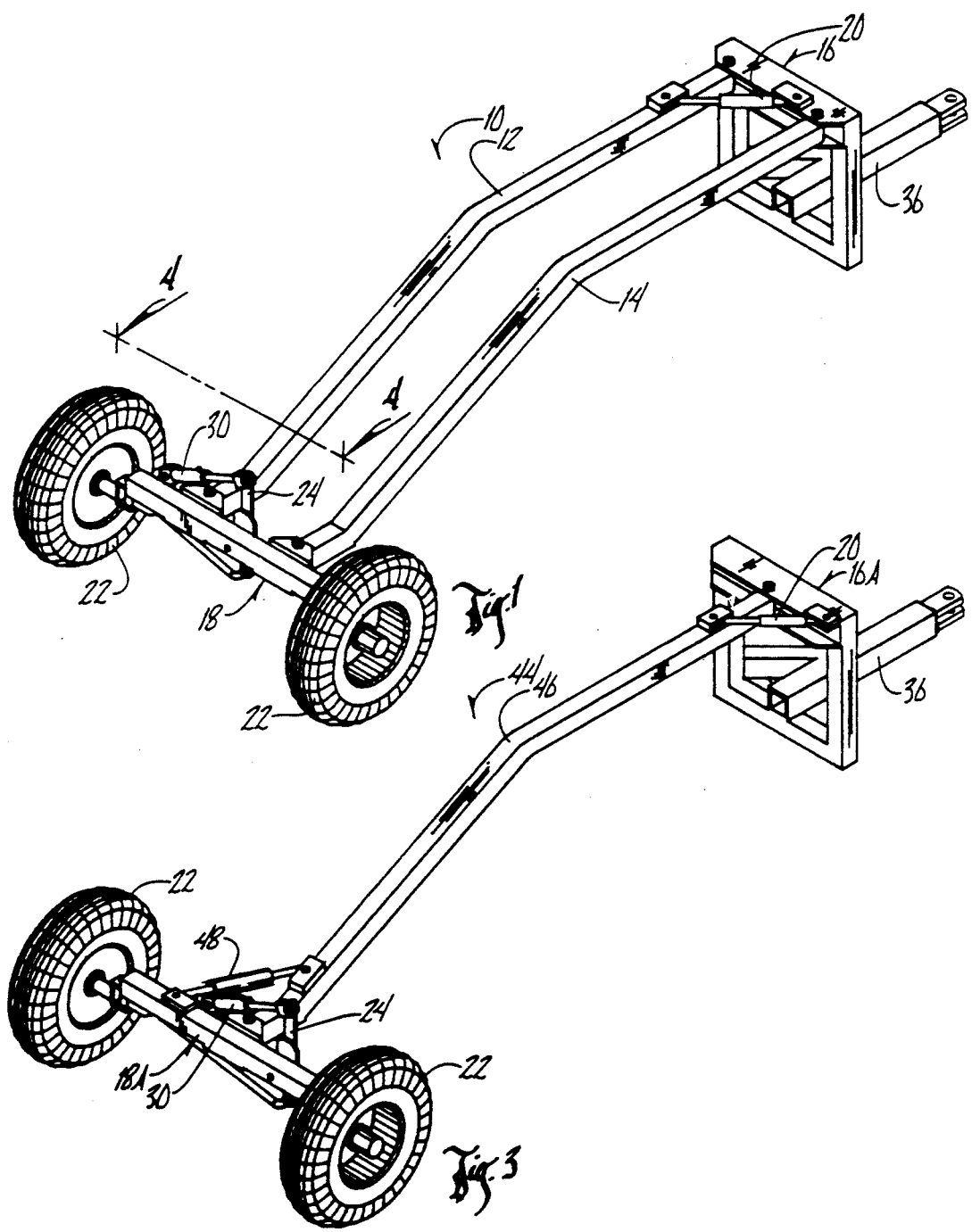

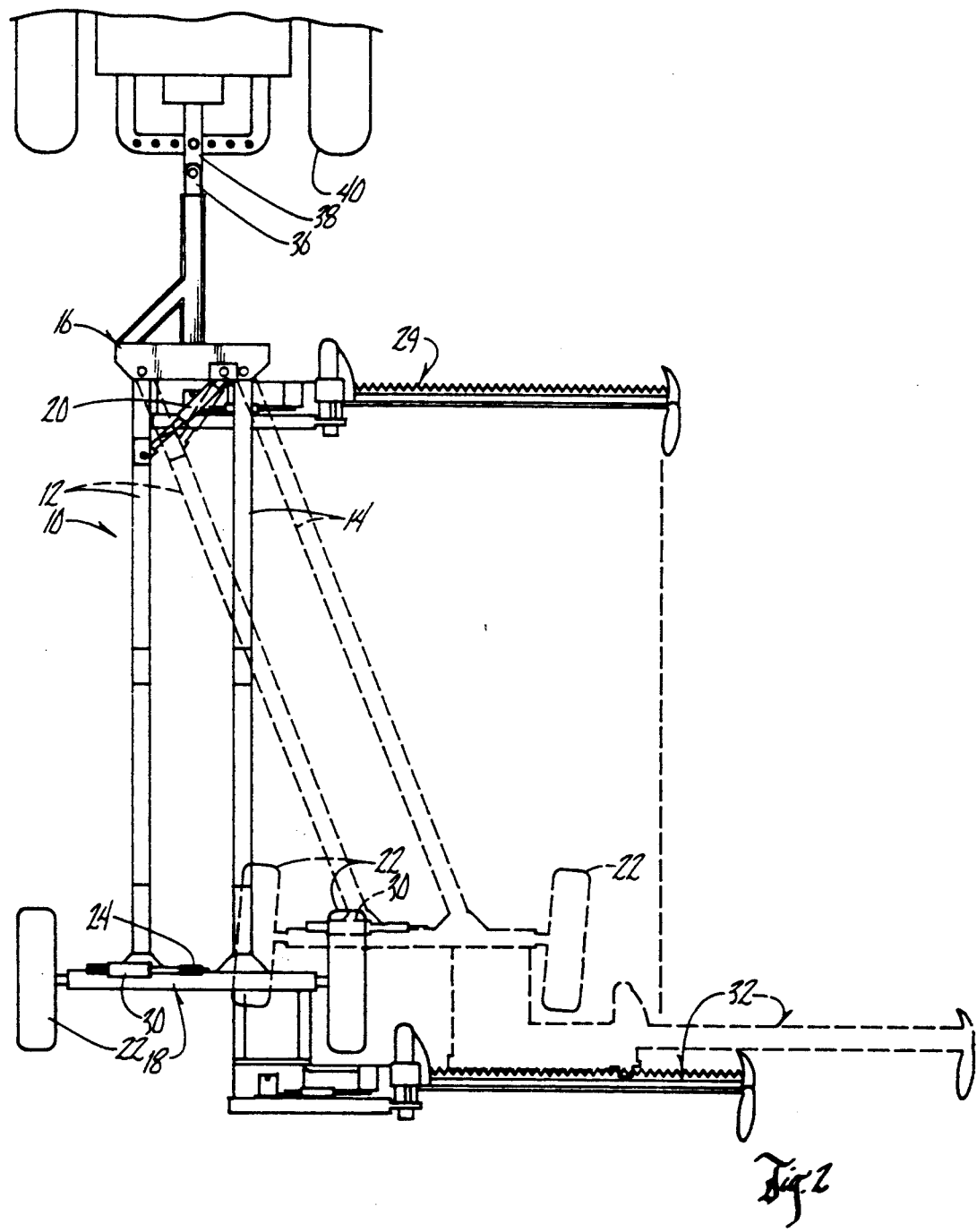

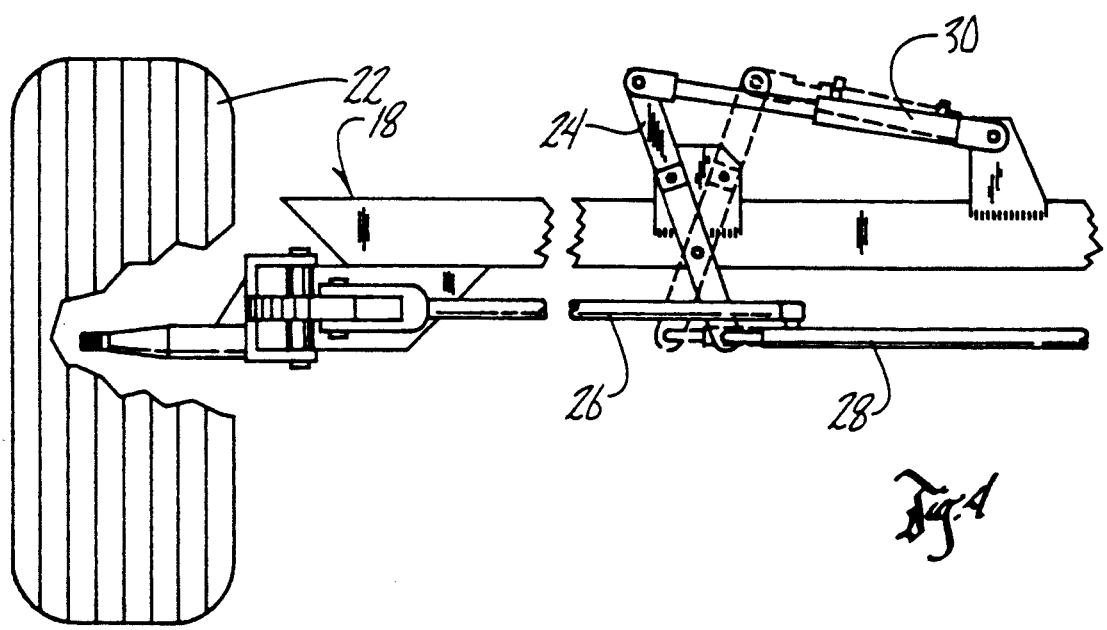

MULTIPLE IMPLEMENT FRAME WITH PARALLEL MOUNTING BARS

BACKGROUND OF THE INVENTION

In my U.S. Pat. No. 4,179,870, Dec. 25, 1979, a frame for tandem mowers is disclosed. The frame is rigid throughout and requires multiple elongated frame members to interconnect the front and rear mower units. Angulation of the frame for positioning of the mower units was accomplished through steerable rear wheels.

This arrangement while working successfully has now been improved upon. What was needed was a more simplified frame and one which could be used with tractor mounted implements as well as towed machines. A frame should also permit the implement to be ground driven, operated by the power takeoff, or a hydraulic system. The frame arrangement should accommodate all kinds of implements including mowers.

SUMMARY OF THE INVENTION

The implement frame of this invention includes front and rear mounting bars which maintain a parallel relationship to each other regardless of the relative lateral positions. The front and rear mounting bars are interconnected by an elongated frame member which pivots to each of them. If a single frame member extends between the front and rear mounting bars then a pair of hydraulic cylinders can be utilized for angulating the frame member to permit lateral positioning of the rear bar relative to the front bar. A first cylinder would extend between the front bar and the elongated frame member and a second cylinder would extend between the rear bar and the elongated frame member and a flow divider would assure equal fluid being delivered to each cylinder for operation which would assure that the front and rear bars remain parallel to each other regardless of their relative lateral positions.

A pair of elongated frame members may be utilized to provide a parallelogram relationship and then a single power cylinder will be sufficient for laterally positioning the rear mounting bar. The rear mounting bar may be wheel supported and the wheels may be steerable to compensate for side draft which would result as the implements are moved forwardly during use when displaced laterally relative to each other. It is seen that the implements may be readily positioned one behind the other for transport purposes or in lateral spaced relationship in either direction as required by a given job. The implement frame may be tractor mounted or pulled by a draw bar and in either event the front and rear mounting bars will always be in a parallel relationship which is perpendicular to the line of travel.

DESCRIPTION OF THE DRAWINGS

FIG. 1 is a perspective view of a multiple implement frame with a pair of elongated frame members interconnecting the front and rear parallel mounting bars.

FIG. 2 is a top plan view thereof showing the implement frame connected to the draw bar of a tractor and having a pair of mowers mounted to the front and rear mounting bars.

FIG. 3 is a perspective view similar to FIG. 1 but showing a single elongated frame member interconnecting the front and rear mounting bars.

FIG. 4 is a cross sectional view taken along line 4—4 in FIG. 1 illustrating the linkage for steering the rear wheels.

DESCRIPTION OF PREFERRED EMBODIMENT

The multiple implement frame of this invention is referred to generally by the reference numeral 10 in FIG. 1. It is seen that the frame includes a pair of elongated frame members 12 and 14 pivotally connected to a front mounting bar 16 and a rear mounting bar 18. A parallelogram relationship is established and maintained throughout different positions of use.

The rear mounting bar 18 may be displaced to the right or left through operation of a hydraulic cylinder 20 extending between the elongated frame member 12 and the mounting bar 16. The rear mounting bar 18 is supported by a pair of wheels 22 which are steerable as seen in FIG. 4 through operation of a lever 24 connected to oppositely extending tie rods 26 and 28. A hydraulic cylinder 30 is shown for operating the lever 24 between the solid and dash line positions.

In FIG. 2 the implement frame 10 is shown having a mower unit 29 mounted on the front mounting bar 16 and a mower unit 32 mounted on the rear mounting bar 18. It is seen that through operation of the power cylinder 20 the rear mower unit 32 may be moved to the lateral dash line position. To compensate for side draft, the wheels 22 may be turned to the right through operation of the cylinder 30 which causes pivoting of the wheels.

It is seen for illustrative purposes only that a tongue 36 has been provided extending forwardly from the mounting bar 16 for connection to a draw bar 38 on a tractor 40. The implement frame 10 could just as easily have been mounted through a three-point hitch or other means to the tractor 40.

As an alternative to the double elongated frame member implement frame of FIGS. 1 and 2, a single elongated frame member unit is shown in FIG. 3 and referred to generally by the reference numeral 44. This unit has a single elongated frame member 46 pivotally connected to a front mounting bar 16A and a rear mounting bar 18A. The power cylinder 20 is provided between the elongated frame member 46 and the front mounting bar 16A and a second power cylinder 48 has been provided for extending between the elongated frame member 46 and the rear mounting bar 18A. A flow divider (not shown) will assure that equal fluid is distributed to front and rear cylinders 20 and 48 to maintain the parallel relationship between the front and rear mounting bars 16A and 18A. The other features of this implement frame are the same as with the double elongated frame member unit 10.

Thus it is seen in use that either of the implement frames of FIGS. 1 or 3 may be used as desired as each should work equally satisfactorily. Obviously the double elongated frame member version of FIG. 1 would be stronger but involves more cost to build. Either of the implement frames 10 or 44 may be quickly maneuvered to position the implements such as mowers 29 and 32 (FIG. 2) as desired. The rear mounting bars may be moved to the left or to the right and the parallel relationship between the front and rear mounting bars 16 and 18 will be maintained.

What is claimed is:

1. A multiple implement frame comprising,
   front and rear implement mounting bars, a frame member means extending between and pivotally interconnecting said front and rear bars, and power means operatively connected to said frame member means and said front and rear mounting bars to vary the angle between said front and rear mounting bars and said frame member means while maintaining said bars in parallel relationship to each other and maintaining a 90° relationship to the line of travel.

2. The structure of claim 1 wherein said frame member means includes a pair of frame members arranged in parallel relationship and forming a parallelogram with said front and rear mounting bars.

3. The structure of claim 1 wherein said power means is further defined as including a first hydraulic cylinder extending between said front bar and said frame member means and a second hydraulic cylinder extending between said rear bar and said frame member means, and a flow divider means is provided which supplies an equal amount of fluid to each of said first and second cylinders whereby said front and rear bars will maintain a parallel relationship to each other.

4. The structure of claim 2 and said power means includes a hydraulic cylinder extending between said front bar and one of said frame members for pivoting said pair of frame members relative to said front and rear bars to selectively laterally position said rear bar relative to said front bar.

5. The structure of claim 1 wherein said rear bar includes steerable wheel means for supporting said rear bar and compensating for side draft.

6. A multiple implement frame comprising, front and rear implement mounting bars, a frame member means extending between and pivotally interconnecting said front and rear bars, power means operatively connected to said frame member means and said front and rear mounting bars to vary the angle between said front and rear mounting bars and said frame member means while maintaining sad bars in parallel relationship to each other, and said frame member means including a pair of frame members arranged in parallel relationship and forming a parallelogram with said front and rear mounting bars.

7. The structure of claim 6 and said power means includes a hydraulic cylinder extending between said front bar and one of said frame members for pivoting said pair of frame members relative to said front and rear bars to selectively laterally position said rear bar relative to said front bar.

* * * * *